United States Patent [19]

Nakamura

[11] Patent Number: 5,321,528
[45] Date of Patent: Jun. 14, 1994

[54] IMAGE PICK-UP DEVICE CORRECTING OFFSET ERRORS FROM A PLURALITY OF OUTPUT AMPLIFIERS

[75] Inventor: Kenichi Nakamura, Isehara, Japan

[73] Assignee: Canon Kabushiki Kaisha, Tokyo, Japan

[21] Appl. No.: 799,184

[22] Filed: Nov. 27, 1991

[30] Foreign Application Priority Data

Nov. 30, 1990 [JP] Japan .................. 2-335252

[51] Int. Cl.⁵ .............................. H04N 1/04
[52] U.S. Cl. .................. 358/482; 358/463; 348/241
[58] Field of Search ............... 358/446, 447, 463, 482, 358/483, 213.11, 213.15, 213.16, 213.17, 213.19, 213.27; 250/214 C, 201.1, 200, 206

[56] References Cited

U.S. PATENT DOCUMENTS

| | | | |
|---|---|---|---|
| 4,580,170 | 4/1986 | Levine | 358/213 |
| 4,602,291 | 7/1986 | Temes | 358/213.19 |
| 4,763,007 | 8/1988 | Takahashi | 358/213.11 |
| 4,785,353 | 11/1988 | Seim | 358/213.26 |
| 4,868,405 | 9/1989 | Nakamura | 250/578 |
| 4,908,875 | 3/1990 | Assael et al. | 358/463 |
| 4,920,428 | 4/1990 | Lin | 358/213.17 |
| 5,105,276 | 4/1992 | Schrock | 358/213.15 |
| 5,157,500 | 10/1992 | Gusmano | 358/213.11 |

FOREIGN PATENT DOCUMENTS

| | | | |
|---|---|---|---|
| 0260954 | 3/1988 | European Pat. Off. | H04N 5/217 |
| 0392754 | 10/1990 | European Pat. Off. | H04N 3/15 |
| 63-006959 | 1/1988 | Japan | H04N 1/04 |
| 2260868 | 10/1990 | Japan | H04N 1/04 |

Primary Examiner—Edward L. Coles, Sr.
Assistant Examiner—Jerome Grant, II
Attorney, Agent, or Firm—Fitzpatrick, Cella, Harper & Scinto

[57] ABSTRACT

A multi-chip linear image sensor for use in, for example, a facsimile machine or a photocopier comprises several chip image sensors, each including photosensors and an output amplifier. To correct for the offset error of the output amplifier caused by processing variations, each chip includes a circuit enabling the amplifier to be isolated, so that its output can be sampled independently of the image signal. To eliminate the offset error a correction circuit is provided as part of the video clamp circuit, for sampling the amplifier output and subtracting it from the subsequent image signals readout through the amplifier.

14 Claims, 4 Drawing Sheets

IMAGE PICK-UP DEVICE CORRECTING OFFSET ERRORS FROM A PLURALITY OF OUTPUT AMPLIFIERS

FIELD OF THE INVENTION

This invention relates to an image pick-up device for use, for example, in facsimile machines, optical document scanning machines or photocopying machines.

DESCRIPTION OF THE RELATED ART

Image pick-up devices having photo conversion cells in a linear array are used in facsimile machines or optical reading machines.

This kind of image sensor is called a linear image sensor, and is produced from, for example, a silicon wafer, so that the length of the sensor is restricted by the size of the wafer. Therefore it is quite difficult to produce an image sensor which has the same length as the width of a document which is read by the sensor.

One solution of this problem was providing an optical system for reducing the size of the document so that the image sensor can read the full width of the document, but the optical system prevents the overall system from being small, and the resolution of the image cannot be maintained.

Another solution was the adoption of a so called "multi-chip" type image sensor which has plural image sensor chips aligned in a straight line, as shown in European applications published as EP 0382540 and EP 0382568.

This kind of multi-chip sensor can output a plurality of output signals from the plurality of image sensors through one single output line, but generally, the multi-chip sensor consists of a plurality of image sensor chips, so that there is a difference between output voltages from different image sensor chips due to processing variations from chip to chip.

Therefore during the manufacturing process a plurality of sensor chips are classified depending on their characteristics, and they are mounted and connected together to constitute one multi-chip sensor. The differences in output voltages of the sensor chips are caused by differences of offset voltage between output voltages of the image pick-up devices.

Although the differences between sensor chips in one multi-chip sensor are reduced by this classifying, there can still be a difference of output voltage between multi-chip sensors despite the classifying, if the image pick-up device consists of a plurality of multi-chip sensors for reading the full width of the document.

Further, although the chips of each multi-chip sensor are mutually matched, they differ between multichip sensors and hence the apparatus into which each one is fitted needs to be individually adjusted to account for the variations in offset voltage or other output level error parameters between multichip sensors, which is a further complex and expensive manufacturing operation. Since the offset voltage may drift or change depending on temperature, aging or other factors, a single compensation set at the factory may in any case be insufficient for reliable long term operation.

SUMMARY OF THE PRESENT INVENTION

An object of the present invention is to provide an improved image pick-up device. Another object is to provide an improved image pick-up device which can reduce the output voltage difference between sensor chips or multi-chip sensors.

According to the first aspect of the invention, there is provided an image pick-up device for picking up an optical image and comprising a plurality of photoconversion cells. Output means are provided for supplying output signals from the photoconversion cells, and means are also provided for controlling the output means so as to produce an offset output signal separate from of the image signal.

This allows the offset of the output means to be separately sampled and stored, and used to correct the image signals.

In a preferred embodiment, the invention further comprises means for subtracting the offset signal from the output signal which was produced by the photoconversion cells. The predetermined signal may be separate from a power source in a preferred embodiment.

In another preferred embodiment, the image pick-up device comprises another group of photoconversion cells and associated output means for supplying an output signal from the other group of photoconversion cells, and the operating means subtract the offset signal from the output signal corresponding to the another group of photoconversion cells.

In a preferred embodiment, the subtracting means comprises a storage capacitor storing the offset signal. It preferably also comprises a clamp circuit for clamping the output signal.

Thus, the invention provides an image sensor chip which includes means for generating a signal allowing the offset voltage within the chip to be separated and compensated for by whatever circuit the chip is later installed within. If a corresponding compensating circuit is provided in the apparatus for which the chip is installed, an image sensor chip having any value of offset can be installed within the device thus avoiding the need for individual calibration of the device or laborious selection of particular chips for particular devices.

Where the image sensors are provided as a linear sensor array for reading a document, for example, separate calibration of chips or multi-chip sensors within the middle of the array is possible.

DETAILED DESCRIPTION OF A PREFERRED EMBODIMENT

Figure 1:
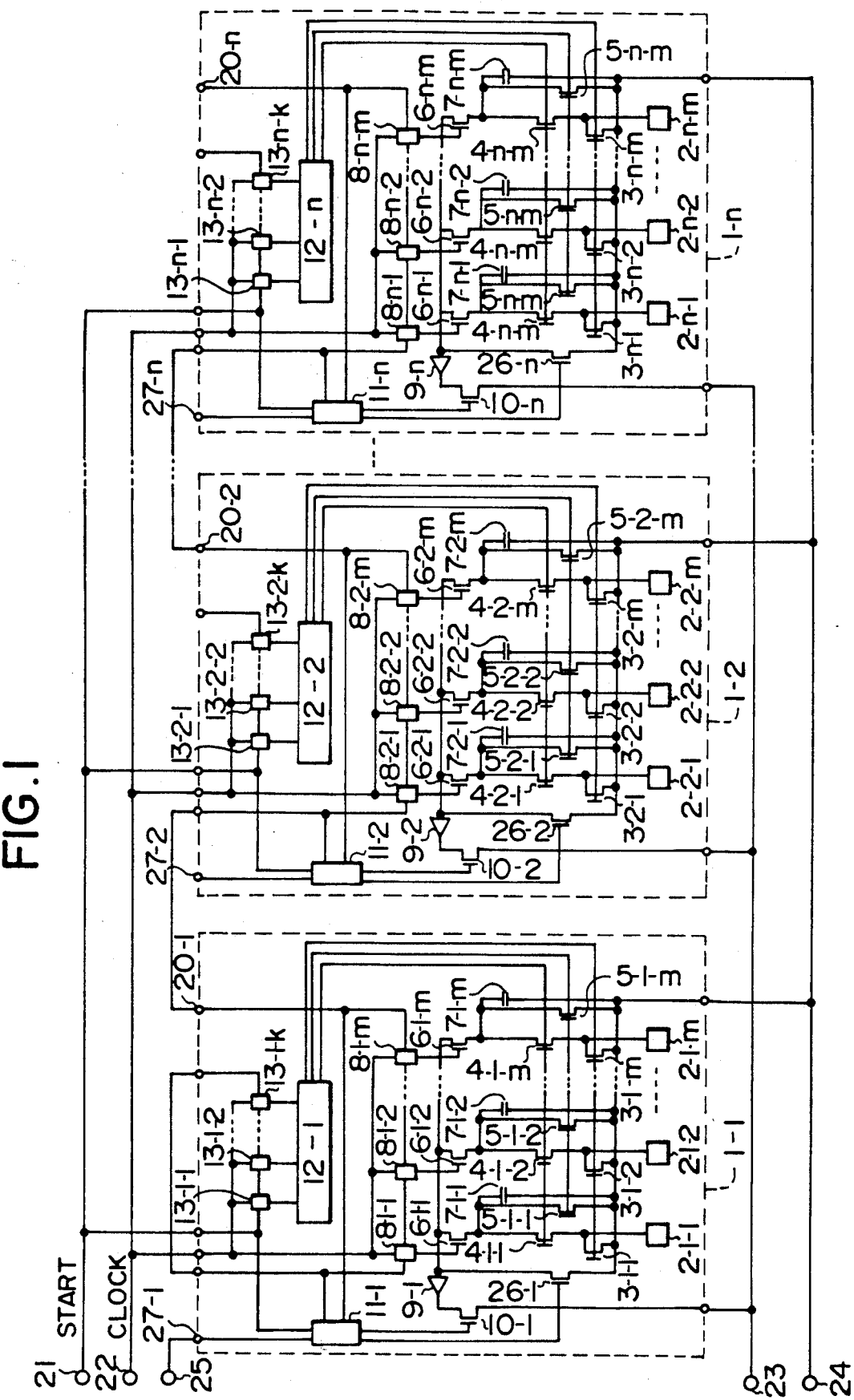
FIG. 1 illustrates a schematic circuit diagram of an image pick-up device of an embodiment of the present invention.
Figure 2:
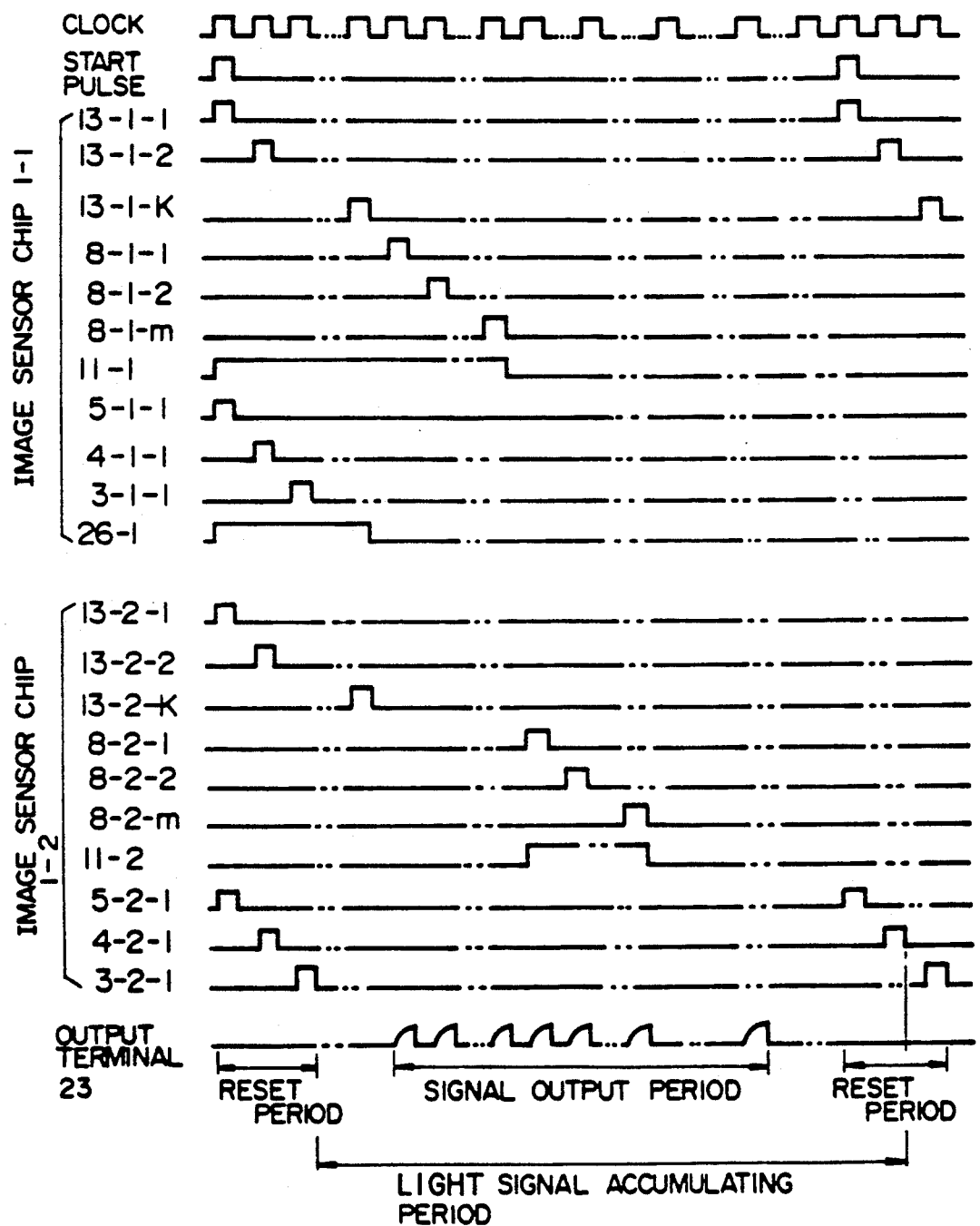
FIG. 2 illustrates a timing chart corresponding to the circuit shown in FIG. 1.

FIG. 1 illustrates a schematic circuit diagram of one embodiment of the present invention and FIG. 2 illustrates a timing chart of the embodiment. In the figure, sensor chips 1-1, 1-2, . . . (surrounded by dashed lines) constitute a multi-chip sensor. In the sensor chips 1-1 to 1-n, photoconversion cells 2-1-1 to 2-n-m can convert an optical signal to an electrical signal. In this embodiment the photoconversion cells 2-1-1 to 2-n-m of the separate multi-chip sensors are aligned as if to constitute one line sensor, and consequently an image pick-up device of a long length can be obtained so that it can read full size (e.g. A4 or A3) documents without any particular optical system. The multi-chip sensor starts operating in synchronism with a CLOCK signal supplied from a CLOCK terminal 22 when a START signal is supplied to a START terminal 21 which is connected to all the sensor chips.

Receiving this START signal, memory address switching shift registers 13-1-1 to 13-n-k make pattern generating memories (for example, ROM circuits or simple logic gate circuits) 12-1 to 12-n operate in synchronism with the clock signal so that, in a first stage, condensor reset MOS switches 5-1-1 to 5-n-m turn on together, and thus an initialization of condensors 7-1-1 to 7-n-m is carried out.

Next, by turning on MOS switches 4-1-1 to 4-n-m together in a second stage, light signals from photoconversion cells 2-1-1 to 2-n-m are transferred to condensors 7-1-1 to 7-n-m. Then, in a third stage, reset MOS switches 3-1-1 to 3-n-m are turned on together for initializing the photoconversion cells 2-1-1 to 2-n-m.

In this embodiment, during the above operation, a reset MOS switch 26-1 is turned on so that a resetting voltage (e.g. ground or 0 Volts) applied to a reset voltage terminal 24 is also applied to an input terminal of an output amplifier 9-1, through the action of a control circuit 11-1 (typically a logic gate circuit), operated in sychronism with the START signal as a predetermined voltage is applied to an input terminal 27-1 through a voltage terminal 25. At this time a MOS switch 10-1 is also turned on by the switch control circuit 11-1 so that the voltage V1 at an output terminal 23 comprises an offset voltage component SV1 of the output amplifier 9-1 and the reset voltage component VS applied from the terminal 24 (or, if the output amplifier 9-1 has other than unity gain, by the reset voltage multiplied by the gain).

After these operations, an output signal of the shift register 13-1-k is applied to the shift register 8-1-1 and the control circuit 11-1, so that a pulse ripples through the stages of the shift register 8-1-1 to 8-1-m and the switches 6-1-1 to 6-1-k are thus sequentially turned on. This causes the electrical signals stored in the condensors 7-1-1 to 7-1-m to be sequentially supplied to the output amplifier 9-1, where they are amplified and supplied from the output terminal 23 through the switch 10-1. The voltage V2 at the output terminal 23 thus comprises a signal component S1 from photoconversion cells 2-1-1 to 2-1-m in turn, together with the offset voltage component SV1 of the output amplifier 9-1.

As mentioned later by subtracting the voltage V1 from the voltage V2 the offset voltage component can be eliminated.

Figure 3:
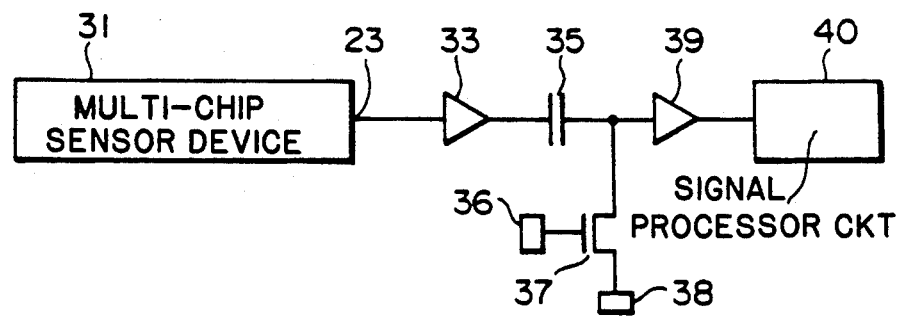
FIG. 3 illustrates a correction circuit connected to the image pick-up device.

This subtracting operation can be carried out for example by a clamp circuit shown in FIG. 3. In this circuit, a multi-chip sensor device 31 corresponds to the device illustrated in FIG. 1.

A clamp circuit is conventionally used in video or image signal processing to provide a constant DC level from a clamp voltage source. However, as discussed below, this circuit may also be employed with the image sensor of the above described embodiment to correct for the offset error of the output amplifier thereof.

The output terminal 23 of the sensor is connected to the subtraction circuit 33, 35, 40. Before reading out the light signals, a signal V1 comprising the sum of the offset component SV1 of the output amplifier 9-1 and the reset voltage component VS is supplied from the image pick-up device 31 via the output line 23 to an input, terminal of a condensor 35; the signal may be buffered by an additional amplifier 33. A MOS switch 37 is kept on so that an output, terminal of the condensor 35 is maintained at reference clamping voltage VC. The clamping voltage VC is supplied from a clamped voltage source 38.

Next the switch 37 is turned off by a control signal source 36 clocked in synchronization with, or controlled by, the control circuit 11-1 so that the output terminal of the condensor 35 is floating. Therefore, while the signals output from the photoconversion elements are read out, an output signal $V2 = S1 + SV1$ from the amplifier 33 is applied to the input terminal of the condensor 35. Here S1 denotes the photoconversion signal component from the sensor chip 1-1.

In this situation the voltage Vout at the output terminal of the condensor 35 is described by the following equation:

$$Vout = VC + (S1 + SV1) - (SV1 + VS) = VC + S1 - VS$$

Therefore as understood from the above equation, the offset voltage component SV1 is eliminated by this operation and the signal at the output terminal of said condensor 35 is supplied to a signal processing circuit 40 for subsequent use (e.g. in a photocopying operation, or for facsimile image encoding) through a further buffering amplifier 39.

In this embodiment, since the chips are classified to have similar offset voltage components it is found that differences between offset voltage components between the amplifiers 9-1 to 9-n are negligable and therefore offset voltage components of output amplifiers 9-2 to 9-n can be practically eliminated by the subtracting operation of the offset voltage component SV1 for the first chip amplifier 9-1.

Therefore in this embodiment, an output of the register 8-1-m is connected to the following register 8-2-1 and a control circuit 11-2, just after the reading out operation of the sensor chip 1-1, a following reading operation for a sensor chip 1-2 is carried out.

However, it would be possible in the event that the chips were less well classified, or not classified, to provide separate offset voltage readout periods prior to the signal readout for each chip, to allow each chip offset to be separately subtracted. Likewise, if several multi-chip sensors are provided, there may be a separate offset readout period for each multi-chip sensor.

As mentioned above output signals from sensor chips 1-2 to 1-n are read out sequentially without the offset voltage components, so that the difference of offset voltages between multi-chip sensors can be eliminated.

The use of the clamping circuit of FIG. 3, which would in any case be present in many apparatuses which include the linear sensor of FIG. 1, provides one convenient way of subtracting the offset information from the image output signal from the image sensor device, without requiring further subtraction components, merely by controlling the sampling times of the clamping circuit in cooperation with the image sensor so that the offset signal is sampled. The effect of the clamp circuit thereafter is then to apply to the output of the image sensor a signal responsive to the difference between the clamping voltage and the threshold level from the output amplifier of the image sensor.

Figure 4:
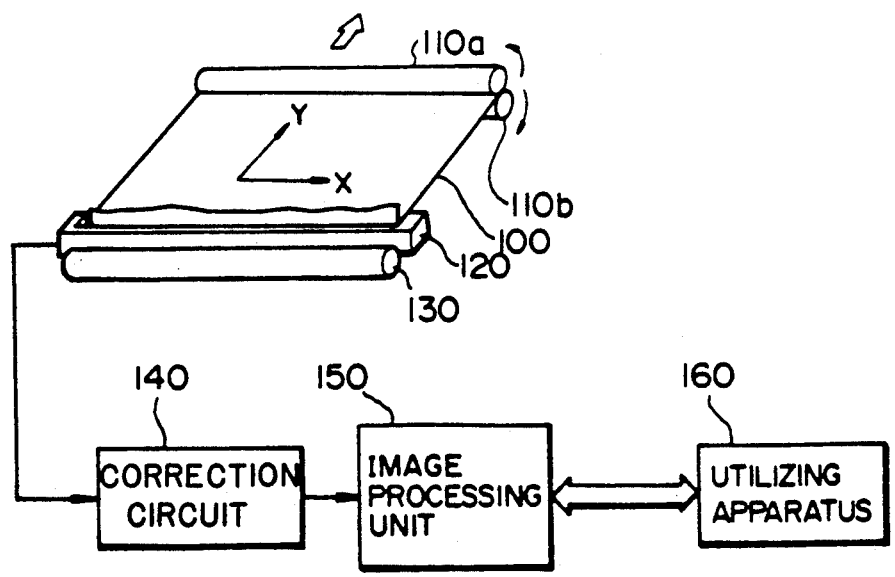
FIG. 4 illustrates schematically the disposition of multi-chip sensor device incorporating an embodiment of the present invention in a document scanning apparatus.

Referring to FIG. 4, a sheet 100 (e.g. a document, for example A3 or A4 size) is transported in a direction Y by a transport system, illustrated as a pair of rotating transport rollers 110a, 110b. Disposed in a direction X transversely (e.g. normal) to the direction Y is a linear sensor unit 120 extending substantially the entire width of the document 100. An illumination source 130 illuminates the surface of the document 100, and the sensor 120 is exposed to the illuminated document. The output of the sensor 120 is then read out through a correction unit 140 which effects the subtraction of the output error in the output stage of the sensor 120 as discussed above, and may therefore comprise the components 33–39 as described with reference to FIG. 3. The corrected output signal is supplied to an image processing unit 150 which may apply, for example, density or gamma conversion. The image processing unit 150 may, for example, comprise an A/D converter and a digital processing circuit including a gamma correction ROM look-up table. The processed signal from the image processing unit 150 is supplied to utilizing apparatus 160 which will utilize the image signal; for example, a facsimile transmitter for encoding and transmitting the image signal via telecommunications network, or a personal computer for utilizing the image signal in a desktop publishing (DTP) application, or an image reproducing apparatus such as a photocopier.

It will be clear from the foregoing that, in practice, the document may be retained static and the document transport system 110 may not be utilized; instead, scanning optics may be provided to effect the scanning in the Y direction. Equally, the correction circuit 140 may be a separate circuit from the clamp circuit, or the correction circuit 140 could comprise part of the image processing unit 150.

Figure 5:
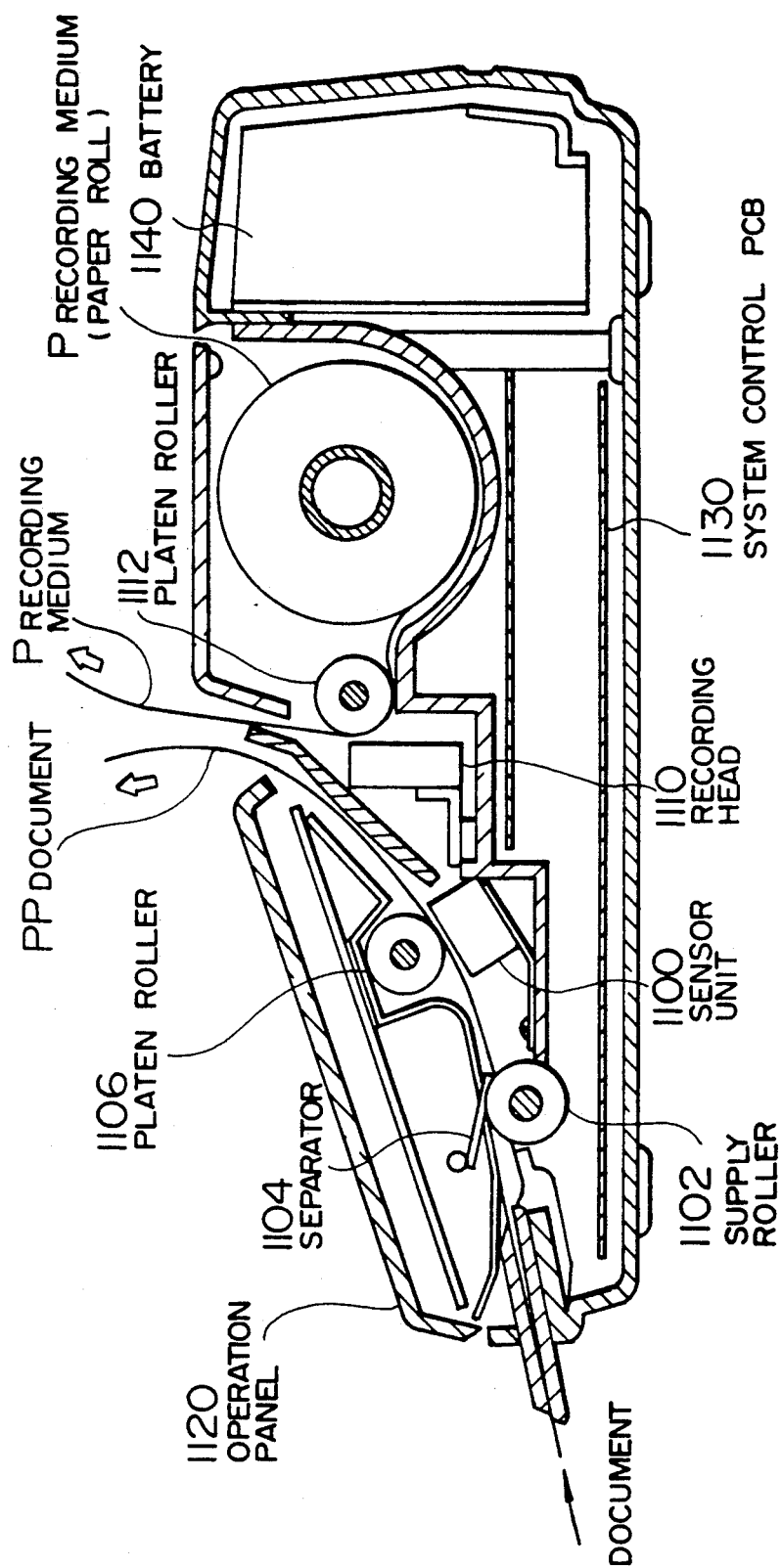
FIG. 5 illustrates schematically one particular apparatus including a sensor device according to this embodiment.

Referring to FIG. 5, one particular application of the sensor according to this embodiment of the invention is in a portable photocopying unit. The unit comprises a chassis, a supply roller 1102 mounted within the chassis to supply a document along a document path through the chassis, a separator 1104 to separate document sheets, and a platen roller 1106 to move the document past the platen and out through an exit in the chassis.

Disposed adjacent to the platen is a sensor unit 1100 comprising the linear sensor 120 and illumination source 130 of FIG. 4. An image recording head 1110 (for example an electrostatic recording head, an ink jet recording head or a laser recording head) is supplied with an image signal derived from the output of the sensor unit 1100 for recordal on a recording medium which is transported past the recording head 1110 by a recording platen roller 1112 receiving a continuous roll of recording medium (paper). A A processing and control printed circuit board (PCB) 1130 receives the output of the sensor unit 1100, and includes the correction circuit 140 and the image processing unit 150, together with a control circuit for supplying the START and CLOCK signals to the lines 21, 22 and a control signal to the terminal 25, and control signals to the recording head 1110. An operations panel 1120 allows the user to control the operation of the PCB 1130; for example, by selecting the density correction to be applied by the image processing unit 150 thereon. A power supply unit (e.g. a battery) 1140 powers the PCB 1130 and the motors for the rollers 1102, 1106, 1112.

The scope of the invention is in no way limited to the above mentioned embodiment.

For example, the various buffer amplifiers 33, 39 may be varied or omitted depending upon the surrounding circuit components. Likewise, the capacitor circuit shown is only one example of a suitable circuit for sampling and storing the offset signal value for subsequent subtraction; other digital or analog storage devices could be employed. Further, the arrangement and reading out of image sensors is not limited to the abovedescribed embodiment, any equivalent circuit arrangement (such as those described in EP 0382540 or EP 0382568) in which the circuit output means can be isolated from the image sensors to generate a signal excluding the image signal but including the offset level is equally applicable to the invention. Similarly, although application of the invention in a linear multi-chip sensor array has been described, two-dimensional sensor arrays, for example, may equally benefit from the application of the invention.

Each photoconversion cell could be of the self-amplifying type in which charges are accumulated in a control region of a transistor, as disclosed for example in our earlier European applications EP 0253678 or EP 0260956. Equally, however, any other type of photoconversion cell could be employed.

We claim:

1. An image pick-up device for generating an image signal from a received optical image, said image pick-up device comprising:
   a plurality of photoconversion cells for photoconverting the received optical image into an electrical signal;
   output means for supplying the electrical signal from said photoconversion cells as a first output signal corresponding to the photoconverted optical image;
   control means for controlling the output means to generate a second output signal corresponding to an offset signal component of said output means separate from the first output signal;
   a signal source for selectively supplying a predetermined signal as an input to said output means; and
   isolating means for isolating said output means from said plurality of photoconversion cells.

2. An image pick-up device according to claim 1, wherein said output means comprises an amplifier, and wherein the predetermined signal corresponds to the reset voltage of said amplifier.

3. An image pick-up device according to claim 1, further comprising at least one further plurality of photoconversion cells and at least one further output means for outputting electrical signals from said further plurality of conversion cells.

4. An image pick-up device according to claim 1, further comprising storage means for storing said offset signal.

5. A device according to claim 4, wherein said storage means comprises a capacitor.

6. A device according to claim 1, further comprising correcting means for reducing the effect of the offset signal in the electrical signal corresponding to the photoconverted optical image.

7. A device according to claim 6, wherein said correcting means subtracts the offset signal from the electrical signal.

8. An image pick-up device according to claim 7, in which the correcting means comprises a capacitor and a clamp circuit, wherein one of the terminals of said capacitor is connected to an output of aid amplifier and another terminal of said capacitor is connected to the clamp circuit.

9. A device according to claim 1, wherein at least one of (i) said plurality of photoconversion cells and (ii) said output means are provided as a separate semiconductor chip device.

10. An image pick-up device according to claim 9, further comprising means for subtracting the offset signal from the output signal corresponding to said further group of photoconversion cells.

11. A linear image sensor device comprising a plurality of semiconductor chip devices each comprising:
   an image pick-up device for generating an image signal, from an optical signal, comprising:
   a plurality of photoconversion cells for photoconverting an optical image into an electrical signal;
   output means for supplying said electrical signal from said photoconversion cells as a first output signal;
   control means for controlling the output means to generate a second output signal so that an offset signal component of said output means can be obtained separately from the device output signal corresponding to the photoconverted signals;
   a signal source for selectively supplying a predetermined signal as an input to said output means; and
   isolating means for isolating said output means from said plurality of photoconversion cells;
   said plurality of semiconductor chip devices being disposed in a linear array.

12. A correction circuit for correcting an output signal from an image pick-up device to remove offset components from the output signal, said connection circuit comprising:
   means for receiving an auxiliary signal from said image pick-up device;
   means for receiving image signals from said image pick-up device, wherein said connection circuit employs the auxiliary signal to correct the image signals by removing the image signals' dependency upon the offset components; and
   a capacitor and clamp circuit arranged to clamp the capacitor at a level dependent on the auxiliary signal and thereby subtract the offset components from the incoming image signal subsequently.

13. A circuit according to claim 12, in which said means for receiving the auxiliary signal receives the auxiliary signal at a different time from a time at which said means for receiving image signals, and there are provided store means for storing said auxiliary signals for subsequent use in correction.

14. A method of operating an image pick-up device which comprises photosensing means and output means, comprising the steps of:
   selectively supplying, from a signal source, a predetermined signal as an input to the output means;
   isolating the output means from the photosensing means;
   deriving from the output means an auxiliary signal affected by offsets of the output means;
   reading out image signals from the photosensing means through the output means so as to be affected by said offset; and
   utilizing the auxiliary signal to correct the readout image signals.

* * * * *

UNITED STATES PATENT AND TRADEMARK OFFICE
CERTIFICATE OF CORRECTION

PATENT NO. : 5,321,528
DATED : June 14, 1994
INVENTOR(S) : KENICHI NAKAMURA

It is certified that error appears in the above-identified patent and that said Letters Patent is hereby corrected as shown below:

ON TITLE PAGE

In [56] References Cited, under FOREIGN PATENT DOCUMENTS:
"2260868  10/1990  Japan" should read
--2-260868  10/1990  Japan--.

COLUMN 2

Line 10, "of" should be deleted.
Line 66, "1-2,..." should read --1-2,...,1-n--.

COLUMN 4

Line 9, "output," should read --output--.

COLUMN 6

Line 24, "our" should be deleted.

COLUMN 7

Line 2, "aid" should read --said--.

UNITED STATES PATENT AND TRADEMARK OFFICE
CERTIFICATE OF CORRECTION

PATENT NO. : 5,321,528
DATED : June 14, 1994
INVENTOR(S) : KENICHI NAKAMURA

It is certified that error appears in the above-identified patent and that said Letters Patent is hereby corrected as shown below:

<u>COLUMN 8</u>

Line 31, "offset;" should read --offsets;--.

Signed and Sealed this

Thirty-first Day of January, 1995

Attest:

BRUCE LEHMAN

Attesting Officer    Commissioner of Patents and Trademarks